L. CHAPMAN.
Nut-Lock.

No. 168,830. Patented Oct. 19, 1875.

Witnesses
Geo. E. Nolan
George G. Sill

Inventor
Luke Chapman
By W. E. Simonds
Atty

UNITED STATES PATENT OFFICE.

LUKE CHAPMAN, OF COLLINSVILLE, ASSIGNOR OF TWO-THIRDS HIS RIGHT TO WILLIAM J. WOOD AND WILLIAM E. SIMONDS, OF HARTFORD, CONN.

IMPROVEMENT IN NUT-LOCKS.

Specification forming part of Letters Patent No. 168,830, dated October 19, 1875; application filed January 25, 1875.

*To all whom it may concern:*

Be it known that I, LUKE CHAPMAN, of Collinsville, in the county of Hartford and State of Connecticut, have invented certain new and useful Improvements pertaining to Nut-Locks, of which the following is a specification, reference being had to the accompanying drawings, where—

Figure 1:
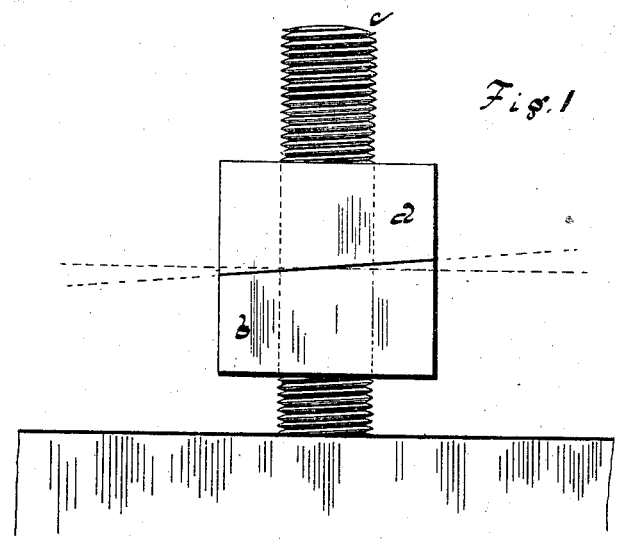
Figure 2:
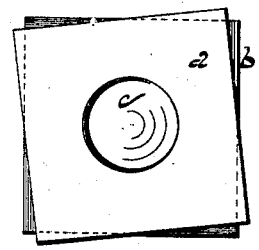
Figure 3:
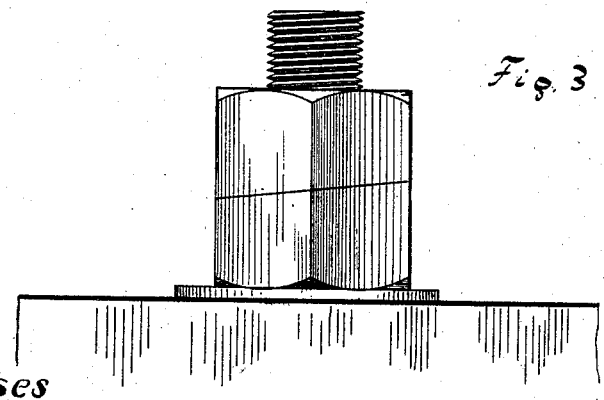

Figure 1 is a side view of two square nuts, embodying my said invention, upon a screw-threaded bolt. Fig. 2 is a top view of the same, with the outer nut rotated backward a trifle. Fig. 3 is a side view of two hexagonal nuts, embodying my said invention, upon a screw-threaded bolt.

The object of the invention is to prevent a nut from turning or rotating on its bolt by means of the vibration or concussion to which nuts are often, in practical use, subjected; and the invention consists in two nuts, to be used in conjunction upon the same bolt, having their opposed or meeting faces composed each of a single inclined plane.

The two nuts *a b*, upon bolt *c*, have their meeting faces inclined or obliqued, as shown in the drawings. When one nut attempts to rotate independently of the other the two inclined planes wedge together and prevent such action. A rotating force applied, as by a wrench, to one of the nuts only, not only has no effect to rotate the other nut but wedges the two the more tightly together.

No particular pitch of the inclined faces of the nuts is absolutely essential; but it is possible to impair the efficient action of the invention by making the screw-thread on the bolt of very steep pitch, while the inclined faces of the nuts have a slight pitch, thus enabling the outer nut to be rotated backward, and away from its fellow. I prefer that the pitch of the inclined faces of the nuts be a trifle less than the pitch of the screw, so that the two nuts may be tightly wedged together the more easily. In actual use I prefer that the two nuts be turned up together on the bolt, which can be done by a common wrench, till the inner nut sits squarely against the washer or fish plate, or other similar surface, and then the outer nut be rotated till it wedges tightly against its fellow-nut.

I am aware that prior to my making this invention a single nut having one slabbed or oblique face had been used for nut-lock purposes; and that I do not claim as my invention.

I claim as my invention—

The combination of two nuts, having their opposed or meeting faces composed each of a single inclined plane, substantially as shown and set forth.

LUKE CHAPMAN.

Witnesses:
WM. E. SIMONDS,
GEO. E. NOLAN.